(12) United States Patent
Prager

(10) Patent No.: US 9,332,694 B2
(45) Date of Patent: May 10, 2016

(54) BLOWER APPARATUS

(71) Applicant: Andreas Stihl AG & Co. KG, Waiblingen (DE)

(72) Inventor: Andre Prager, Virginia Beach, VA (US)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 14/708,316

(22) Filed: May 11, 2015

(65) Prior Publication Data

US 2015/0237808 A1 Aug. 27, 2015

Related U.S. Application Data

(63) Continuation-in-part of application No. 13/422,515, filed on Mar. 16, 2012.

(51) Int. Cl.
*A47L 5/14* (2006.01)
*A01G 1/12* (2006.01)
*E01H 1/08* (2006.01)

(52) U.S. Cl.
CPC . *A01G 1/125* (2013.01); *A47L 5/14* (2013.01); *E01H 1/0809* (2013.01); *Y10T 137/85978* (2015.04)

(58) Field of Classification Search
CPC ................. A01G 1/125; E01H 1/0809; Y10T 137/85978; A47L 5/14
USPC .................................................. 15/327.5, 405
IPC ........................................................... A47L 5/14
See application file for complete search history.

(56) References Cited

U.S. PATENT DOCUMENTS 6,226,833 B1 5/2001 Kawaguchi et al.
6,843,639 B2 1/2005 Schutt

*Primary Examiner* — David Redding
(74) *Attorney, Agent, or Firm* — Gudrun E. Huckett

(57) ABSTRACT

A blower apparatus has a drive motor and a blower device operatively connected to the drive motor. A blower tube is connected to the blower device and has an outlet opening remote from the blower device. A blower air stream conveyed by the blower device passes through the blower tube in the direction of a longitudinal center axis of the blower tube and exits through the outlet opening in an outflow direction. A pivoting device that pivots the blower tube is provided. A nozzle is supported to be freely pivotable on the blower tube about at least one pivot axis, wherein the outlet opening is formed on the nozzle. The nozzle forms the pivot device for pivoting the blower tube and utilizes a transverse force that is generated by the blower air stream in the nozzle for pivoting the blower tube.

20 Claims, 10 Drawing Sheets

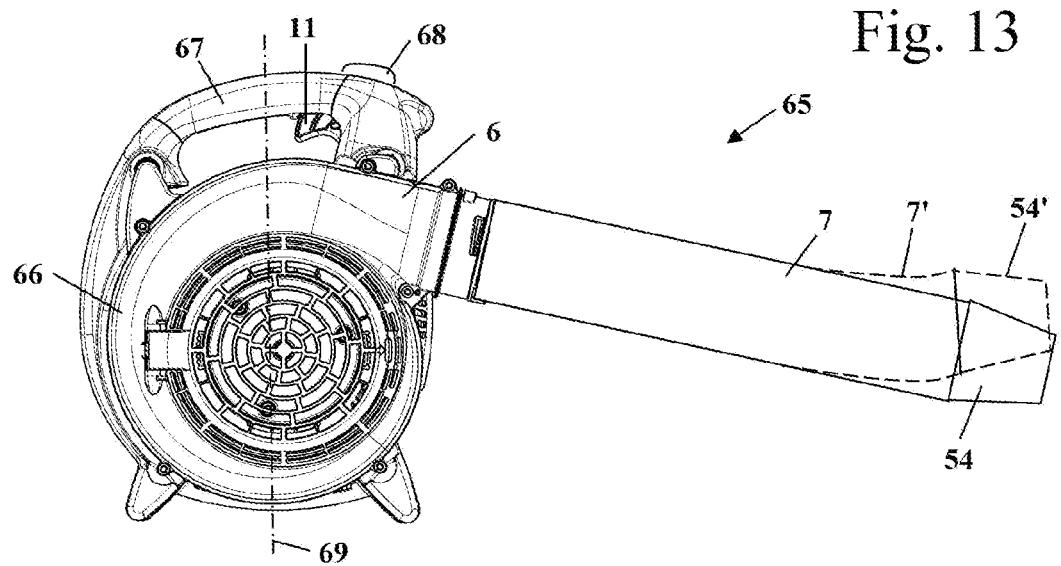
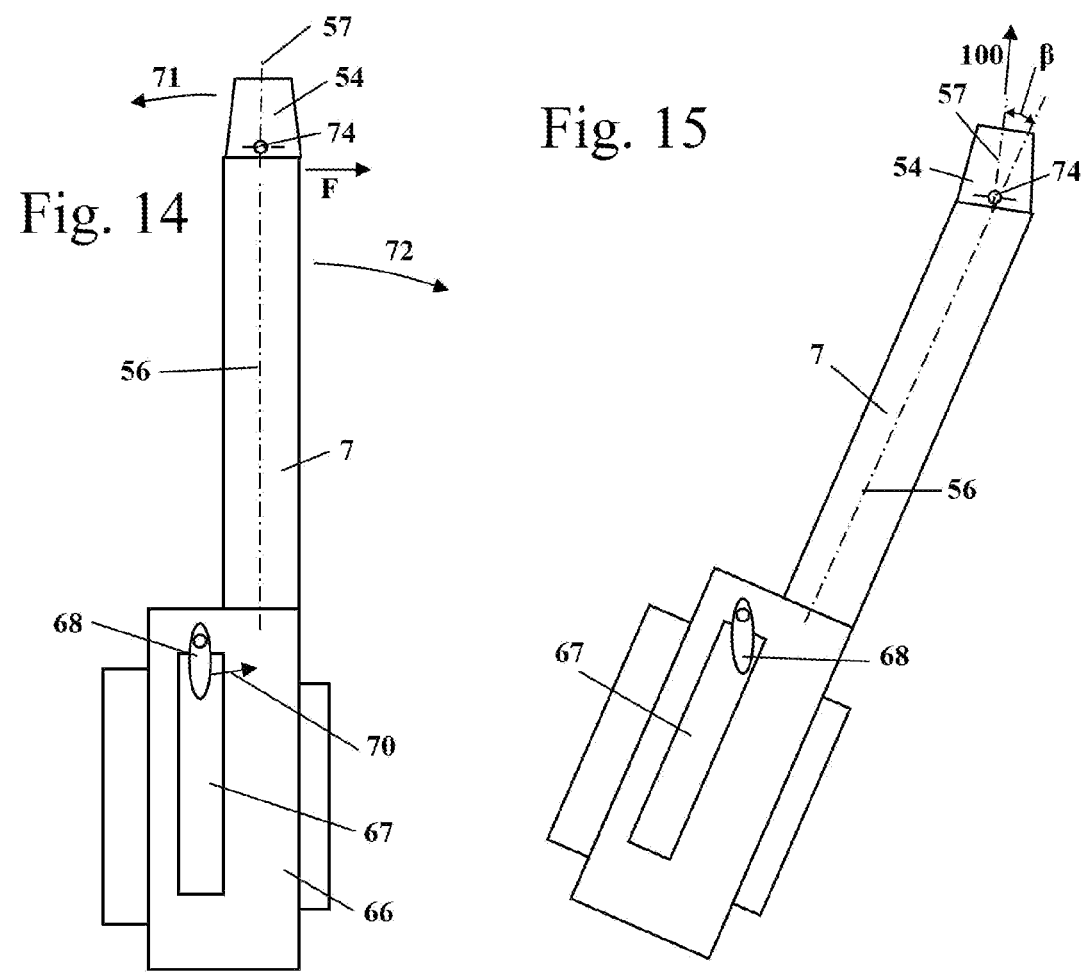
Fig. 13
Fig. 14
Fig. 15

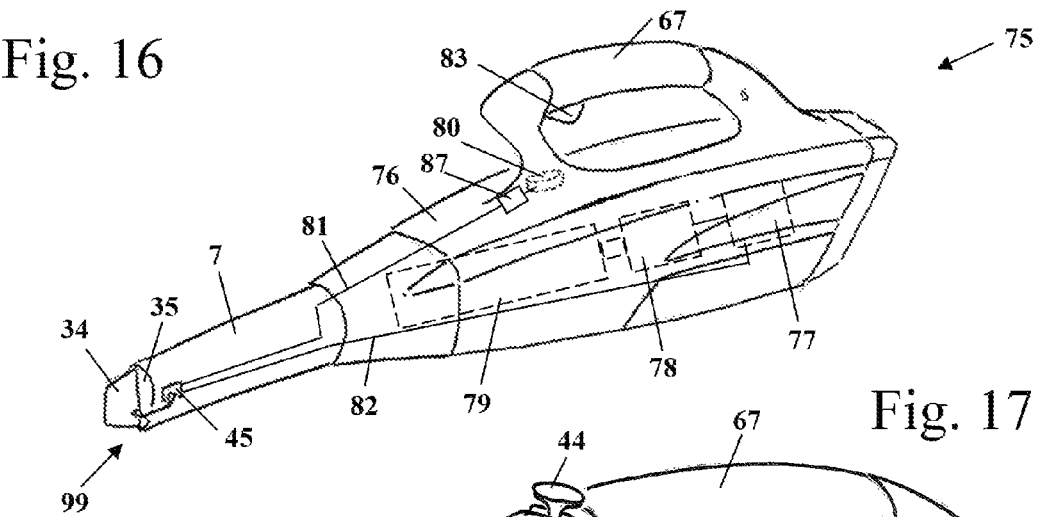
Fig. 16
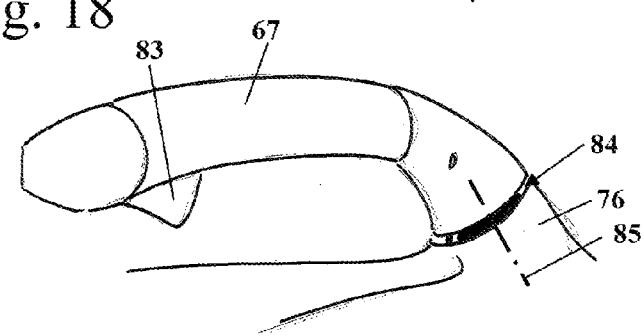
Fig. 17
Fig. 18
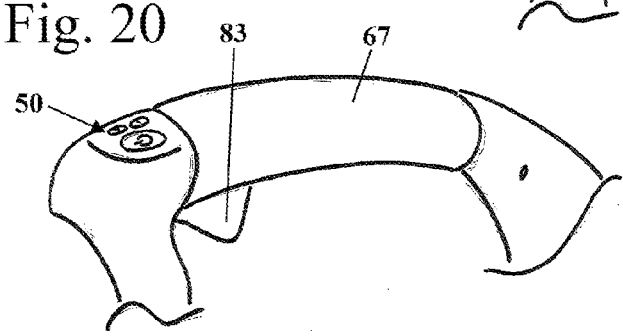
Fig. 19
Fig. 20

BLOWER APPARATUS

CROSS-REFERENCE TO RELATED APPLICATIONS

This application is a continuation-in-part application of U.S. application patent Ser. No. 13/422,515 having a filing date of 16 Mar. 2012 and claims a priority date of 18 Mar. 2011, based on prior filed German patent application No. 10 2011 014 344.0, the entire contents of the aforesaid U.S. patent application and the aforesaid German patent application being incorporated herein by reference.

BACKGROUND OF THE INVENTION

The invention relates to a blower apparatus through which a blower air stream conveyed by a blower device is passing wherein the blower device is driven by a drive motor of the blower apparatus. The blower air stream flows in the blower tube in the direction of a longitudinal center axis of the blower tube and exits from the blower tube at an outlet opening in an outflow direction. The blower apparatus has a pivoting device for pivoting the blower tube and, in the non-actuated state of the pivoting device, the outflow direction is parallel to the longitudinal center axis of the blower tube.

Handheld or backpack blower apparatus in which the blower tube is guided by the operator are known in general. In the usual operating mode, the blower tube is moved back and forth by the operator and/or is moved up and down, for example, to blow away leaves or the like. When the blower apparatus is embodied as a spraying device, the movement of the blower tube serves for uniformly distributing the material to be sprayed onto the surfaces to be sprayed with the material.

U.S. Pat. No. 6,226,833 B1 discloses a blower apparatus that is supported by wheels on the ground and has a blower tube adjusted by means of Bowden cables. In this connection, the entire blower tube is moved by means of the Bowden cables. This requires a comparatively large force.

SUMMARY OF THE INVENTION

It is an object of the present invention to provide a blower apparatus of the aforementioned kind that enables force-saving work with the blower apparatus.

In accordance with the present invention, this is achieved for a blower apparatus of the aforementioned kind in that a nozzle is supported on the blower tube to be freely pivotable about at least one pivot axis, wherein the outlet opening is formed on the nozzle. The nozzle forms the pivoting device for pivoting the blower tube and utilizes a transverse force that is generated by the blower air stream at the outlet opening for pivoting the blower tube.

For pivoting (swiveling) the blower tube, it is provided to adjust the outflow direction out of the blower tube. When the outflow direction out of the blower tube is tilted relative to the longitudinal center axis of the blower tube, the deflection of the blower air stream generates a transverse force out of the blower tube that effects pivoting of the blower tube to the side of the blower tube that is facing away from the outflow direction. In this way, a pivot movement of the blower tube can be achieved in a simple way. The energy for pivoting is provided by the blower air stream itself and not by the operator so that a force-saving ergonomic working with the blower apparatus is enabled. A simple configuration results when a nozzle is provided and the outlet opening is formed on the nozzle. In this context, the nozzle is supported on the blower tube so as to be freely pivotable about at least one pivot axis. The nozzle is thus not forcibly guided with respect to its movement but can align itself freely in accordance with the inertia forces and mass forces acting on the nozzle. The free pivotability is provided in this context advantageously within a constructively predetermined or adjustable angular range. The nozzle forms in this context the pivoting device for pivoting the blower tube and utilizes a transverse force generated by the blower air stream in the outlet opening for pivoting the blower tube.

It has been found that an automatic pivoting device can be realized in a simple way by a freely pivotable support action of the nozzle. In order to achieve deflection of the nozzle from its central position, the operator must pivot the blower tube in one direction. The nozzle is supported pivotably in such a way that, as a result of its mass inertia, it is pivoted relative to the blower tube upon when the blower tube is pivoted. The friction forces between nozzle and blower tube are so small that the mass inertia forces are sufficient in order to pivot the nozzle relative to the blower tube. In this context, the outlet opening follows or trails behind the pivot axis. As a result of the slanted position of the outlet opening relative to the blower tube, a force is generated that is acting on the blower tube in the direction of the pivot movement that has been initiated by the operator so that the movement of the blower tube initiated by the operator is assisted. When the blower tube as a result of the stiffness of a bellows of a backpack-type blower tube or as a result of a damping device provided on a hand-held blower apparatus is slowed down or braked, the nozzle pivots relative to the blower tube as a result of its mass inertia in the opposite direction. Accordingly, a force in the opposite direction is exerted on the blower tube. Depending on the configuration of the nozzle, the pivot movement initiated by the operator can be assisted or a free pivoting action of the blower tube can be generated by means of the nozzle that is supported on the blower tube so as to be freely pivotable. Amplitude and frequency of the pivot movement depend on the mass and the mass distribution of the nozzle as well as the length of the nozzle.

Advantageously, a first end of the nozzle is supported pivotably on the blower tube and the second end the nozzle is provided with the outlet opening. Advantageously, at least one stop between nozzle and blower tube is formed which determines an end position of the pivot movement of the nozzle.

The amplitude and the frequency of the pivot movement of the blower tube depend on the geometry of the nozzle. In order to enable adaptation to the operator, it is advantageously provided that the nozzle comprises devices for adjustment of the amplitude and/or the frequency of the pivot movement of the blower tube. The devices for adjustment of amplitude and/or frequency of the pivot movement of the blower tube may comprise a mass body whose position relative to the pivot axis of the nozzle is changeable. By change of the position of the mass body, the weight distribution of the nozzle and thus the mass inertia of the nozzle are affected. This influences frequency and amplitude of the pivot movement. Also, the force which is exerted by the blower air stream at the nozzle and acting on the blower pipe is adjustable in this way. In this way, it can be adjusted whether the nozzle automatically causes a pivot movement of the blower tube or assists the operator when performing a pivot movement. In order to enable an adjustment that is substantially continuous, it is advantageously provided that the mass body is slidably arranged on the nozzle. A simple configuration results when the mass body is formed as a ring which is slidably supported on the nozzle. However, a mass body which is supported like a slide can be advantageous also.

For adjusting amplitude and/or frequency of the pivot movement of the blower tube, alternatively or additionally, the distance of the pivot axis relative to the outlet opening can be adjustable. Advantageously, the nozzle is of a two-part configuration wherein a first section of the nozzle is supported pivotably on the blower tube and a second section of the nozzle that is adjustable relative to the first section is provided with the outlet opening. The second section can be in particular a tubular section which is inserted into the first section or is pushed onto the first section and is longitudinally slidable relative to the first section.

Advantageously, a blocking device is provided which blocks in a blocking position the pivot movement of the nozzle relative to the blower tube and in a release position enables pivot movement of the nozzle. By means of the blocking device, the assist action of the pivot movement by the pivotably supported nozzle can be switched on or off.

Advantageously, a damping device is provided which dampens the pivot movement of the blower tube and/or of the nozzle. The damping device also has an effect on the amplitude and/or the frequency of the pivot movement of the blower tube. The damping effect of the damping device is advantageously adjustable such that the operator can adjust a desired damping action and thus a desired amplitude, frequency, and type of assist action of the pivot movement of the operator.

Advantageously, the blower apparatus is a handheld blower apparatus that has a housing on which a blower tube and a handle are secured. The handle in this connection is fixedly connected by means of the housing with the blower tube so that the blower tube can be directly guided by the operator. However, the blower apparatus can also be a backpack blower apparatus, in particular a spraying device, wherein the blower tube is arranged movably relative to a backpack carrying frame and wherein a handle is arranged on the blower tube. In this case, the blower tube is also directly guided by the operator.

BRIEF DESCRIPTION OF THE DRAWING

FIG. 13 a side view of an embodiment of a blower apparatus.

FIG. 14 is a schematic plan view of the blower apparatus of FIG. 13 in the rest position.

FIG. 15 is a plan view onto the blower apparatus of FIG. 14 after pivoting.

FIG. 16 is a schematic perspective illustration of an embodiment of a blower apparatus.

FIG. 17 shows schematically a perspective illustration of an embodiment of a handle of a blower apparatus.

FIG. 18 shows schematically in perspective illustration another embodiment of a handle of a blower apparatus.

FIG. 19 shows schematically in a perspective illustration yet another embodiment of a handle of a blower apparatus.

FIG. 20 shows schematically in a perspective illustration a further embodiment of a handle of the blower apparatus.

DESCRIPTION OF THE PREFERRED EMBODIMENTS

Figure 1:
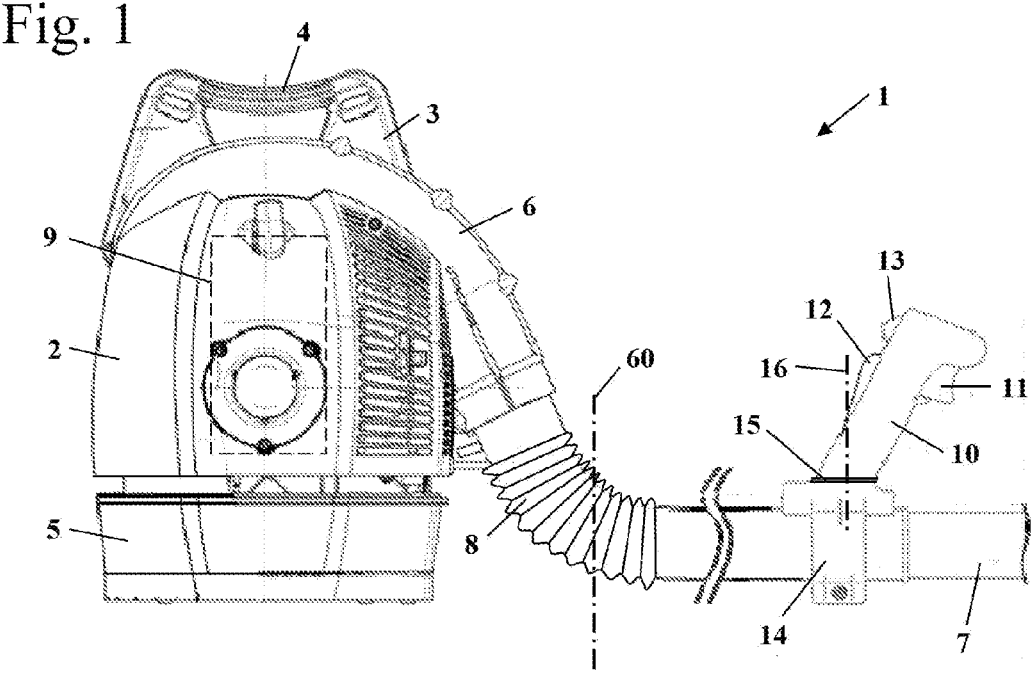
FIG. 1 is a side view of a backpack blower apparatus.
Figure 2:
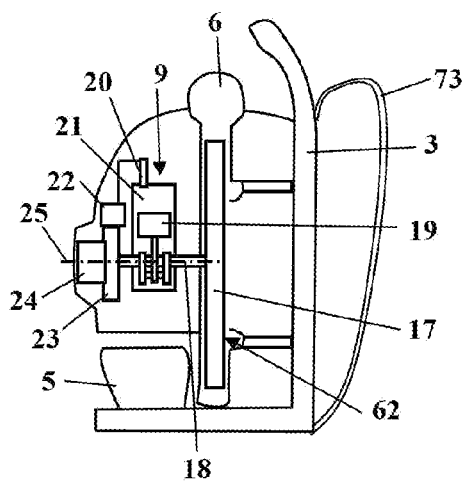
FIG. 2 is a schematic section view of the blower apparatus of FIG. 1.

FIG. 1 shows a blower apparatus 1 to be carried on the back of the operator (backpack blower apparatus). The blower apparatus 1 has a housing 2 in which a drive motor 9 is arranged. The drive motor 9 is embodied as an internal combustion engine. As shown in FIG. 2, the drive motor 9 has a piston 19 that drives in rotation a crankshaft 18 about axis of rotation 25. The piston 19 delimits a combustion chamber 21 into which a spark plug 20 projects. The spark plug 20 is connected to an ignition module 22 that is arranged on the outer circumference of a fan wheel 23. The fan wheel 23 is fixedly connected to the crankshaft 18 and has one or several pole shoes that induce the ignition voltage in a coil of the ignition module 22. The ignition module 22 may also provide the energy for further electrical consumers of the blower apparatus 1. Adjacent to the fan wheel 23, a starter device 24 is arranged that is advantageously configured as a cable starter and serves for starting the drive motor 9. On the side opposite the starter device 24 a blower wheel 17 is connected to the crankshaft 18. The blower wheel 17 conveys working air into a blower spiral 6. The blower wheel 17 constitutes the blower device 62 of the blower apparatus 1. As shown in FIG. 1, the outlet of the blower spiral 6 is connected by means of a folded bellows section 8 to the blower tube 7 into which the blower air stream is conveyed. The folded bellows section 8 enables a movement of the blower tube 7 in all spatial directions. In case of a pivoting movement in approximately horizontal orientation, the blower tube 7 is approximately pivoted about a pivot axis 60 that is schematically illustrated in FIG. 1.

A handle 10 is arranged at the blower tube 7. The handle 10 is connected by means of a sleeve 14 with the blower tube 7. The handle 10 is pivotable relative to the sleeve 14 at a rotary joint 15 about axis of rotation 16. The handle 10, viewed from the position of the operator, can be pivoted to the right and to the left. On the handle 10 a throttle trigger 11, a throttle lock 12, and a stop switch 13 are arranged.

As shown in FIGS. 1 and 2, the housing 2 of the blower apparatus 1 is arranged on a carrying frame 3. In the upper area, the carrying frame 3 has a carrying handle 4. In operation, the operator carries the carrying frame 3 by means of shoulder straps 73 on the operators's back. As also shown in FIGS. 1 and 2, below the housing 2 a fuel tank 5 for supply of fuel to the drive motor 9 is provided.

Figure 3:
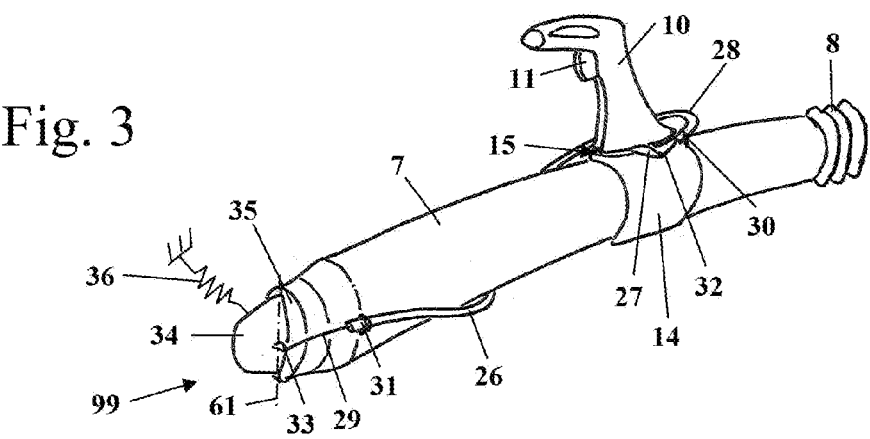
FIG. 3 shows the blower tube of the blower apparatus of FIG. 1 with the pivoting device in the rest position.

FIG. 3 shows a pivoting device 99 of the blower apparatus 1. As shown in FIG. 3, the handle 10 that is supported rotatably on the sleeve 14 is provided with an actuating lever 27 that is fixedly connected to the handle 10 and extends outwardly relative to the axis of rotation 16. The first end 32 of an inner wire 29 of a Bowden cable 26 is connected to the actuating lever 27. The first end 30 of a Bowden cable housing 28 of the Bowden cable 26 is connected to the sleeve 14. A second end 31 of the Bowden cable housing 28 is secured on the blower tube 7 adjacent to an outlet opening 35 of the blower tube 7. The blower air stream exits from the blower tube 7 through the outlet opening 35. In the area of the outlet opening 35, a flow guiding element 34 is arranged on the blower tube 7 and is embodied as a flat plate. A second end 33 of the inner wire 29 of the Bowden cable 26 is connected to the flow guiding element 34. Upon rotation of the handle 10 to the right, when viewed from the position of the operator, the inner wire 29 of the Bowden cable 26 is pulled through the Bowden cable housing 28 to the first end 32. In this way, the flow guiding element 34, viewed from the position of the operator, is pivoted to the left, i.e., opposite to the pivot movement of the handle 10. Pivoting of the flow guiding element 34 is carried out against the force of the spring 36 that is indicated schematically in FIG. 3. The spring 36 can engage the flow guiding element 34 but also the Bowden cable 26 and effects a restoring movement of the flow guiding element 34 into the non-actuated position. In the non-actuated position no transverse force F is acting on the blower tube 7. Advantageously, the flow guiding element 34 is also spring-loaded in the opposite direction. In this way, the flow guiding element 34 is also returned into the non-actuated position when rotating the handle 10 to the left and pivoting the flow guiding element 34 to the right.

Figure 4:
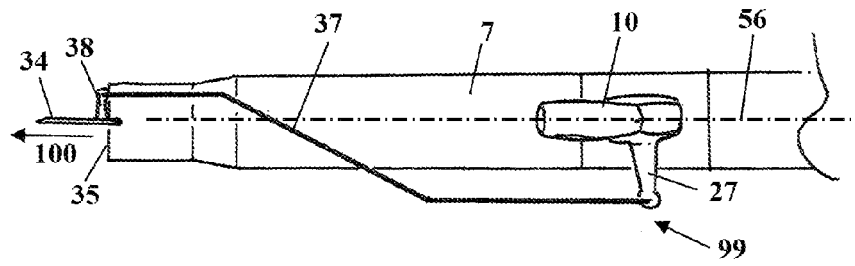
FIG. 4 is a schematic plan view onto a blower tube with pivoting device in rest position.
Figure 5:
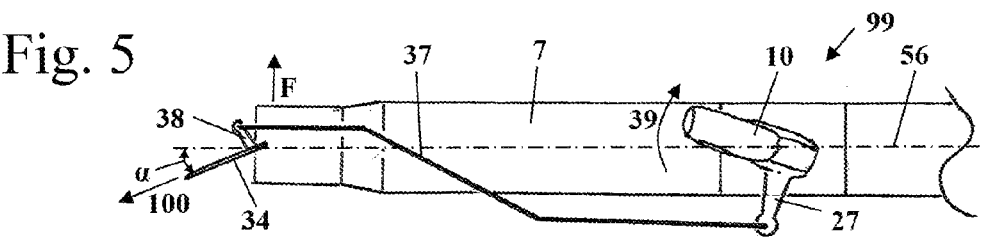
FIG. 5 shows the blower tube of FIG. 4 with actuated pivoting device before pivoting.
Figure 6:
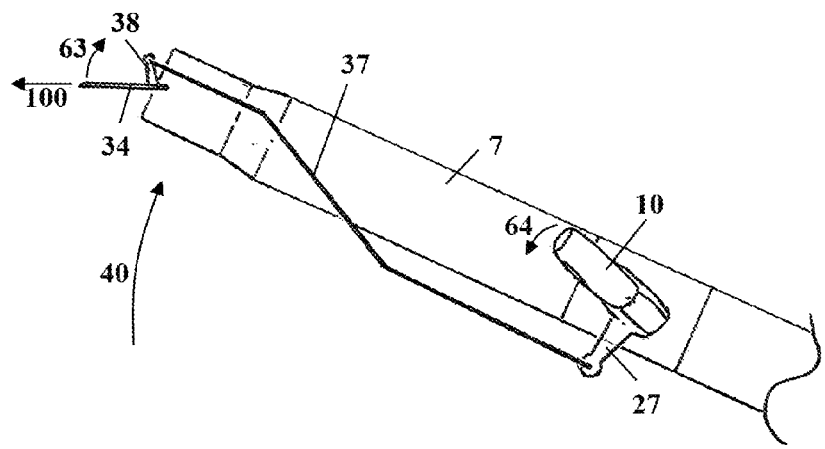
FIG. 6 shows the blower tube of FIG. 4 after pivoting and before return of the pivoting device.

FIGS. 4 through 6 show a further embodiment based on which the function of the pivoting device 99 will be explained. In the embodiment according to FIGS. 4 to 6, instead of the Bowden cable 26 for mechanical transmission of the adjusting movement of the handle 10 onto the flow guiding element 34, a linkage 37 is provided. FIG. 4 shows the pivoting device 99 in the non-actuated position. The handle 10 and the flow guiding element 34 are oriented in the direction of a longitudinal center axis 56 of the blower tube 7. The blower air stream flows out of the outlet opening 35 in the outflow direction 100 that is parallel to the longitudinal center axis 56 and to the flow guiding element 34. As shown in FIGS. 4 to 6, the linkage 37 engages an actuating lever 38 that is fixedly connected to the flow guiding element 34.

For pivoting the blower tube 7, the operator moves the handle 10 that serves as an actuating element in the direction of arrow 39, i.e., in clockwise direction in the illustrations in plan view. By means of the linkage 37 the flow guiding element 34 is deflected in the opposite direction, i.e., in counterclockwise direction. The flow guiding element 34 and the outflow direction 100 extending parallel to the flow guiding element 34 are positioned at angle $\alpha$ relative to the longitudinal center axis 56. The angle $\alpha$ can be, for example, in the range between approximately 5 degrees and approximately 75 degrees. As a result of the outflow direction 100 being positioned at a slant relative to the longitudinal center axis 56, the blower air stream exerts a transverse force F on the blower tube 7 that is acting perpendicular to the longitudinal center axis 56 in the direction of the side that is facing away from the flow guiding element 34. Because of the transverse force F, the blower tube 7, as indicated in FIG. 6 by the arrow 40, is pivoted in clockwise direction. After carrying out the pivot movement, the handle 10 is pivoted back in the direction of arrow 64 in counterclockwise direction into the initial position, for example, by an appropriate spring action. Accordingly, the flow guiding element 34 is pivoted in the direction of arrow 63 into the initial position in which the outflow direction 100 is parallel to the longitudinal center axis 56 of the blower tube 7. As soon as the flow guiding element 34 is again oriented parallel to the longitudinal center axis 56, transverse forces F are no longer acting on the blower tube 7. The operator by pivoting the handle 10 about the axis of rotation 16 can thus pivot the entire blower tube 7. By periodic back and forth rotation of the handle 10, the blower tube 7 can be periodically pivoted back and forth. In this way, simple ergonomic working is enabled. The restoring action into the initial position can be realized by the operator or advantageously by an appropriate spring action of the handle 10, of the linkage 37, and/or of the flow guiding element 37.

Figure 7:
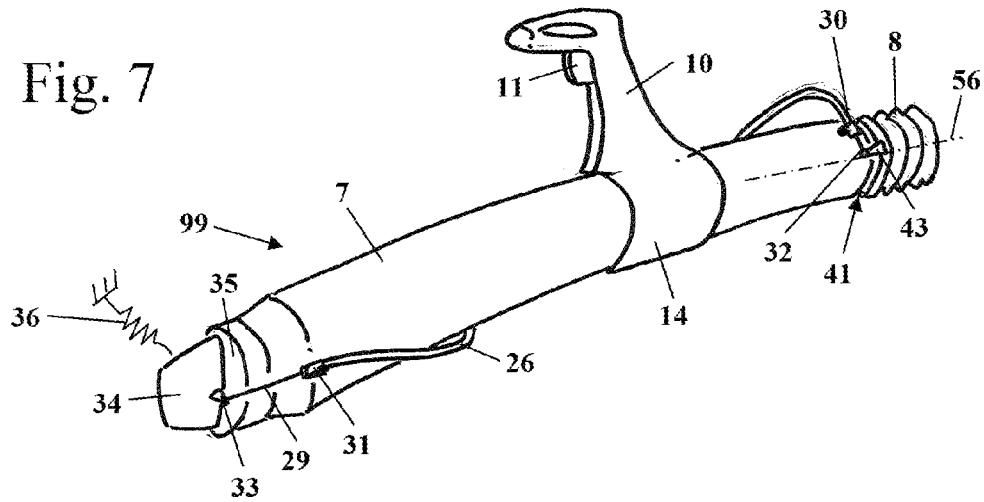
FIG. 7 is a perspective illustration of an embodiment of a pivoting device.

In the embodiment illustrated in FIG. 7, the handle 10 is connected fixedly to the sleeve 14. The blower tube 7 is supported rotatably relative to the folded bellows section 8 by means of rotary joint 41. The blower tube 7 can be pivoted relative to the folded bellows section 8 about the longitudinal center axis 56 of the blower tube 7. The first end 32 of the inner wire 29 of the Bowden cable is connected by means of an actuating lever 43 with the folded bellows section 8. The first end 30 of the Bowden cable housing 28 is connected to the blower tube 7. As also shown in the embodiment illustrated in FIG. 3, the second end 33 of the inner wire 29 of the Bowden cable is connected to the flow guiding element 34 and the second end 31 of the Bowden cable housing 28 with the blower tube 7. When pivoting the handle 10 to the right, viewed from the position of the operator, the flow guiding element 34 is deflected to the left and the blower tube 7 is pivoted as a result of the created transverse force F to the right. Pivoting of the handle 10 to the left pivots the blower tube 7 to the left.

Figure 8:
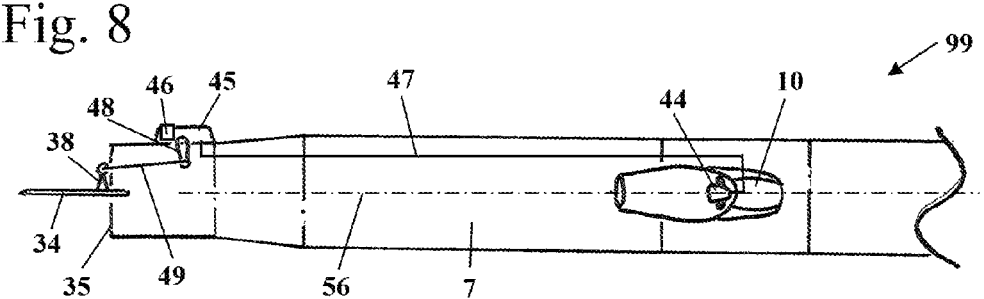
FIG. 8 is a schematic illustration of an embodiment of the pivoting device.

In the embodiment of a pivoting device 99 illustrated in FIG. 8, on the handle 10 that is fixedly connected to the blower tube 7 an operating lever 44 is arranged that is pivotable by the operator, for example, by operator's thumb, to the right or to the left. The deflection of the operating lever 44 is transmitted by an electrical connecting line 47 to a solenoid 45 that is supplied by a battery 46 with energy. The solenoid 45 deflects by means of an actuating lever 48 and a coupling rod 49 the actuating lever 38 at the flow guiding element 34. Upon pivoting of the operating lever 44 in plan view of FIG. 8 in upward direction (to the right when viewed from the position of the operator), the flow guiding element 34 is pivoted downwardly (to the left viewed from the position of the operator), so that a transverse force F in upward direction results and vice versa. The operating lever 44 is advantageously spring-loaded in the direction toward the non-actuated position illustrated in FIG. 8 and controls the solenoid 45 in such a way that the latter, after completion of the pivot movement, will return the flow guiding element 34 into the initial position.

Figure 9:
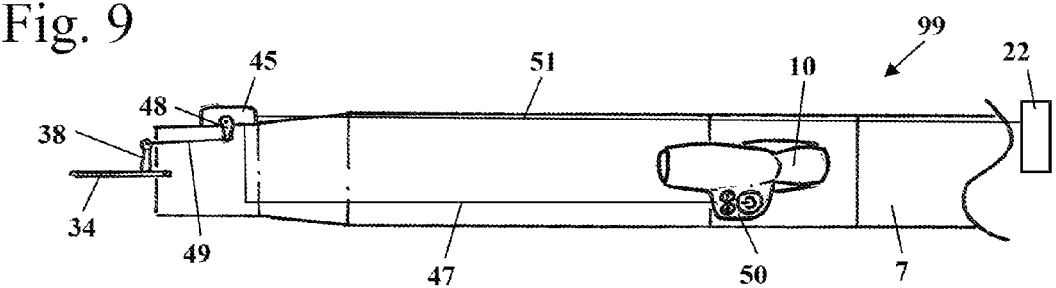
FIG. 9 is a schematic illustration of another embodiment of the pivoting device.

In the embodiment illustrated in FIG. 9, on the handle 10 a keypad 50 is provided that, for example, comprises a foil-type keypad or a touchpad or is in the form of several switches. In addition, a display on the handle 10 can be provided. The operator can control the pivot movement of the pivoting device 99 by means of the keypad 50. In this connection, is also possible to provide a periodic movement of the blower tube 7 in particular by predetermining the frequency and the stroke of the deflection. As in the embodiment of FIG. 8, a connecting line 47 is connected to a solenoid 45; the keypad 50 acts through the connecting line 47 on the solenoid 45. The solenoid 45 is connected by connecting line 51 with the ignition module 22 of the internal combustion engine and is supplied by it with energy.

Figure 10:
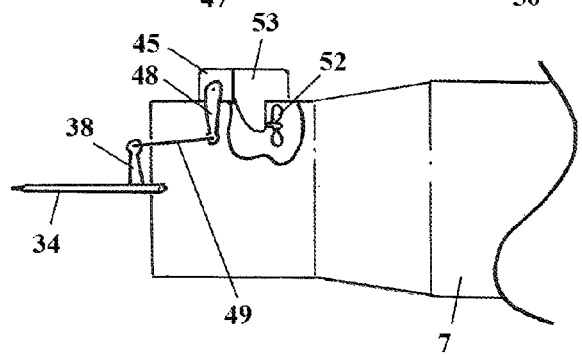
FIG. 10 is a schematic illustration of yet another embodiment of the pivoting device.

FIG. 10 shows an alternative embodiment for the energy supply of the solenoid 45. The control element for deflecting the solenoid 45 can be embodied in this connection in the same way as in the preceding Figures. In the blower tube 7 a wind wheel 52 is arranged so as be exposed to the blower air stream; the wind wheel drives a generator 53. The generator 53 converts the rotation of the wheel 52 into electrical energy for actuating the solenoid 45.

Figure 11:
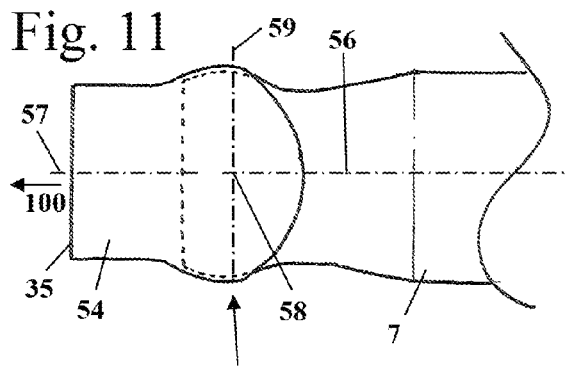
FIG. 11 shows a blower tube with pivotable nozzle in a plan view.
Figure 12:
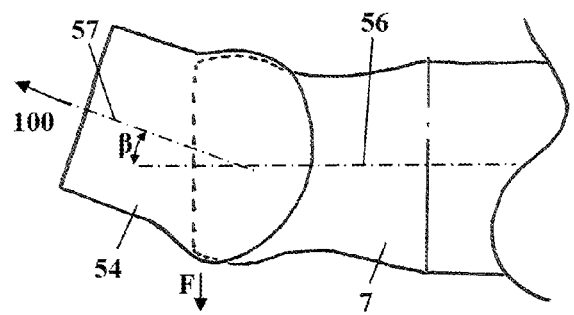
FIG. 12 shows the blower tube of FIG. 11 with pivoted nozzle.

In FIGS. 11 and 12, instead of a flow guiding element 34 in the blower tube 7, an adjustable nozzle 54 is provided at the end of the blower tube 7. In this context, the term nozzle is to be understood to have a broad meaning and refers to an element movably arranged at the end of the blower tube 7 that guides the blower air stream. In the non-actuated position illustrated in FIG. 11, the longitudinal center axis 57 of the nozzle 54 is parallel to the longitudinal center axis 56 of blower tube 7. The nozzle 54 is secured by means of a pivot bearing 55 on the blower tube 7 that enables pivoting about a first pivot axis 58 that is perpendicular to the paper plane of the drawing as well as to the pivot axis 59 that is perpendicular thereto. In this way, the nozzle 54 can be moved or deflected up and down and laterally to the right and to the left as well as in all intermediate directions.

In the actuated state that is illustrated in FIG. 12, the longitudinal center axis 57 of the nozzle 54 is positioned relative to the longitudinal central axis 56 at an angle β. In this way, a transverse force F is acting on the blower tube 7 by the blower air stream and causes the blower tube 7 to deflect.

In an advantageous embodiment, the nozzle 54 is supported on the blower tube 7 so as to be freely pivotable. An actuating element for adjustment of the nozzle 54 is advantageously not provided. The function of such a nozzle 54 that is supported on the blower tube 7 so as to be freely pivotable is explained in FIGS. 27 through 36 that illustrate further freely pivotable nozzles.

FIG. 13 shows the embodiment of a hand-held blower apparatus 65. The blower apparatus 65 has a housing 66 on which a handle 67 is secured by means of antivibration elements, not illustrated. In the housing 66 an internal combustion engine, not illustrated, is arranged as a drive motor that by means of a blower device conveys of blower air stream through a blower spiral 6. The inner configuration corresponds approximately to the configuration of the blower apparatus 1 illustrated in FIG. 2. At the exit from the blower spiral 6 a blower tube 7 is secured that has a pivotable nozzle 54 at its end. The nozzle 54 is pivotable about pivot axis 74 that, in the regular working position, is arranged approximately perpendicular or slightly inclined to the vertical. In addition or alternatively, pivoting of the nozzle 54 about a horizontally positioned pivot axis in the usual working position is possible also. On the handle 67 a throttle trigger 11 as well as an operating lever 68 are arranged. The operating lever 68 acts on a pivoting device that is not illustrated in detail in FIGS. 13 to 15. The pivoting device can be designed in accordance with any of the pivoting devices of the preceding Figures.

Upon pivoting of the operating lever 68 in the direction of arrow 70 shown in FIG. 14, the nozzle 54 pivots about pivot axis 74 in opposite direction, i.e., in the direction of arrow 71. In this way, a transverse force F is exerted onto the blower tube 7 that pivots the blower tube 7 in the direction of arrow 72. The pivot position of the blower apparatus 65 is illustrated in FIG. 15. Since the operator holds the blower apparatus 65 by the handle 67, the blower tube pivots with the entire blower apparatus 65 about pivot axis 69 illustrated in FIG. 13; this pivot axis 69 extends approximately through the center of the handle 67. As shown in FIG. 15, the longitudinal center axis 57 of the nozzle 54 is positioned relative to the longitudinal center axis 56 of the blower tube 7 in actuated position of the pivoting device at an angle β. After pivoting, the nozzle 54 is returned into its central position, for example, by appropriate spring action. In this way, no further transverse force F is acting on the blower tube 7.

The blower tube 7 in the embodiment of FIG. 7 is straight. Alternatively, a curved blower tube can be used. A curved blower tube is schematically shown in FIG. 13 as blower tube 7'. The blower tube 7' is curved upwardly in the illustrated work position. A bend in a different direction may be advantageous also. A nozzle 54' is arranged at the blower tube 7' and is pivotable about a pivot axis 74 illustrated in FIGS. 14 and 15. The pivot axis 74 is oriented approximately perpendicular or slightly inclined relative to the vertical in the usual work position illustrated in FIG. 13. In all the other embodiments, it is also possible to employ a curved blower tube 7' in place of the straight blower tube 7.

FIG. 16 shows schematically a blower apparatus 75 that is also embodied as a hand-held blower apparatus. The blower apparatus 75 comprises a housing 76 on which a handle 67 is secured. On the handle 67 an operating lever 83 for a drive motor 78 arranged in the housing 76 is provided. The drive motor 78 is embodied as an electric motor and is supplied with energy by battery pack 77 arranged within the housing 76.

The drive motor 78 drives a blower device 79 that conveys a blower air stream through the blower tube 7 of the blower apparatus 75. As shown also in FIG. 16, in the area of the outlet opening 35 a flow guiding element 34 is arranged in the blower tube 7 that is controlled by solenoid 45. The solenoid 45 is supplied with electrical energy by the battery pack 77. The solenoid 45 is connected to the battery pack 77 by connecting line 82. The blower apparatus 75 comprises a gyro sensor 80 that is connected by means of evaluation electronics 87 and a connecting line 81 to the solenoid 45. The gyro sensor 80 detects a pivot movement that is initiated by the operator at the handle 67 of the blower apparatus 75. The evaluation electronics 87 detects a pivot movement and transmits a corresponding signal to the solenoid 45. The solenoid 45 adjusts the flow guiding element 34 in the outlet opening 35 so that the pivot movement initiated by the operator is amplified and the blower apparatus 75 is pivoted in the direction desired by the operator. In the shown embodiment, the gyro sensor is arranged in the housing 76 in the area adjacent to the handle 67. However, it may also be advantageous to arrange the gyro sensor 80 adjacent to the outlet opening 35, for example, together with the solenoid 45 in a common module. Instead of the illustrated electrical gyro sensor also a mechanical gyro can be provided as a gyro element. The drive action of a mechanical gyro element can be realized, for example, by the blower air stream that is conveyed through the blower tube 7.

In the embodiment according to FIG. 17, an operating lever 44 is provided on the handle 67 instead of a gyro sensor 80 as actuating element.

In the embodiment according to FIG. 18, the handle 67 is pivotably supported on the housing 76 with a rotary joint 84 about rotary axis 85 and constitutes the actuating element for the pivoting device 99. The axis of rotation 85 is not positioned perpendicularly but at a slant. In this way, an automatic centering action is realized. The weight of the blower apparatus 75 effects a return movement into the non-actuated position of the pivoting device.

In the embodiment according to FIG. 19, on the handle 67 sensor surfaces 86 are provided wherein advantageously on each side of the handle 67 at least one sensor surface is provided. The sensor surfaces 86 react, for example, to pressure and recognize a pivot movement of the blower apparatus 75 initiated by the operator by means of the pressure exerted onto the sensor surfaces 86. The pivot movement desired by the operator is amplified by appropriate adjustment of the flow conducting element 34 or a nozzle 54 arranged within the end of the blower tube.

In the embodiment according to FIG. 20, for actuation of the pivoting device 99 a keypad 50 is provided.

Figure 21:
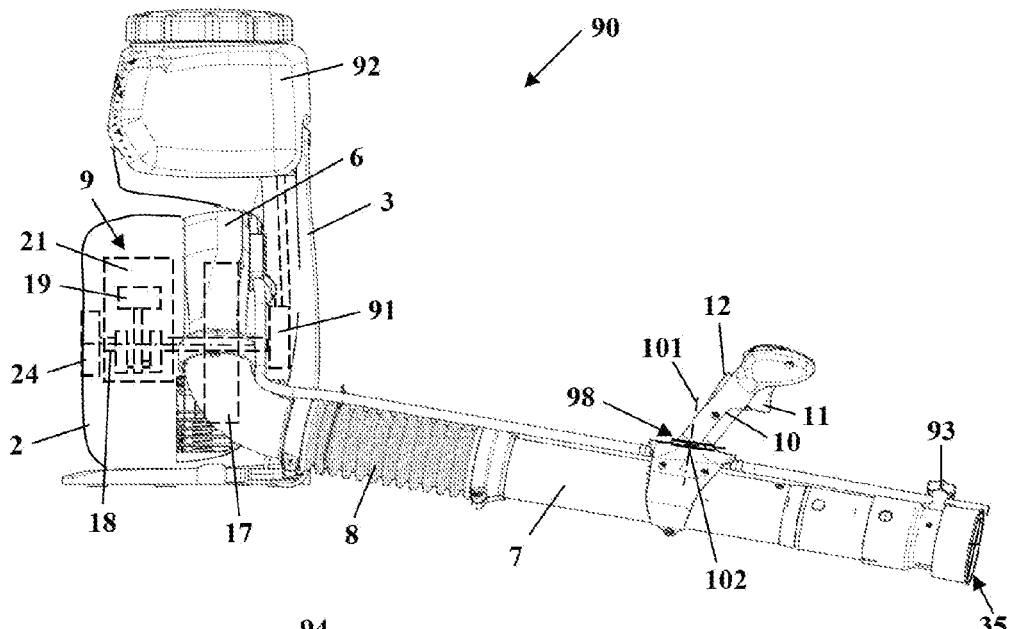
FIG. 21 shows schematically a side view of a spraying apparatus.

In the embodiment illustrated in FIG. 21, a blower apparatus 90 is shown that is embodied as a sprayer device. The blower apparatus 90 comprises a housing 2 that is arranged on a carrying frame 3. In the housing 2 a drive motor 9 embodied as an internal combustion engine is arranged. The configuration corresponds to the configuration shown in FIG. 2 wherein same reference numerals indicate same elements. On the carrying frame 3 a spraying agent container 92 is arranged also. The crankshaft 18 of the drive motor 9 drives also a pump 91 for conveying the spraying agent in addition to driving the blower wheel 17. It may also be provided that the spraying agent is conveyed by gravity out of the spraying agent container 92. Adjacent to the outlet opening 35 a metering valve 93 is arranged on the blower tube 7 by means of which the spraying agent is supplied to the blower air stream.

The handle 10 is connected by means of joint 98 to the sleeve 14 that is secured on the blower tube 7. The joint 98 enables a rotary movement of the handle 10 to the right and to the left about a first axis of rotation 101 and a movement of the handle 10 in upward and downward direction about a second pivot axis 102.

Figure 22:
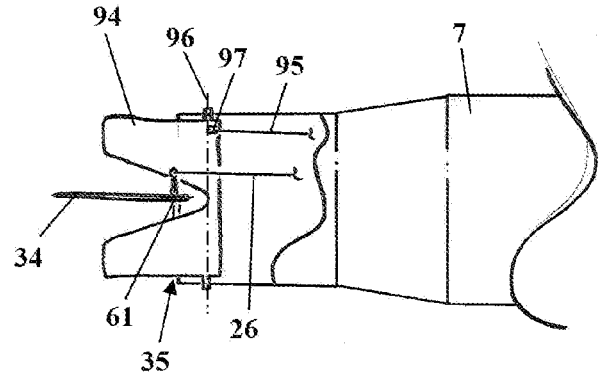
FIG. 22 is a schematic partially sectioned illustration of the blower tube of the spraying apparatus of FIG. 21.

As shown in FIG. 22, adjacent to the outlet opening 35 two flow guiding elements 34 and 94 are arranged. The flow guiding element 34 is pivotable about the pivot axis 61 that is approximately vertical in horizontal position of the blower tube 7. The second flow guiding element 94 is pivotable about the pivot axis 61 that is approximately horizontally positioned and extends perpendicular to the pivot axis 61. For actuating the flow guiding element 94, a Bowden cable 95 is provided that is connected to the handle 10 and engages the flow guiding element 94 by means of actuating lever 97. By means of the two flow guiding elements 34 and 94 that are positioned perpendicularly to each other, a pivot movement of the blower tube 7 in two directions that are perpendicular to each other can be realized. The deflection of the flow guiding element 94 can be realized mechanically or by means of an electrical actuator, as describe in connection with flow guiding element 34.

Figure 23:
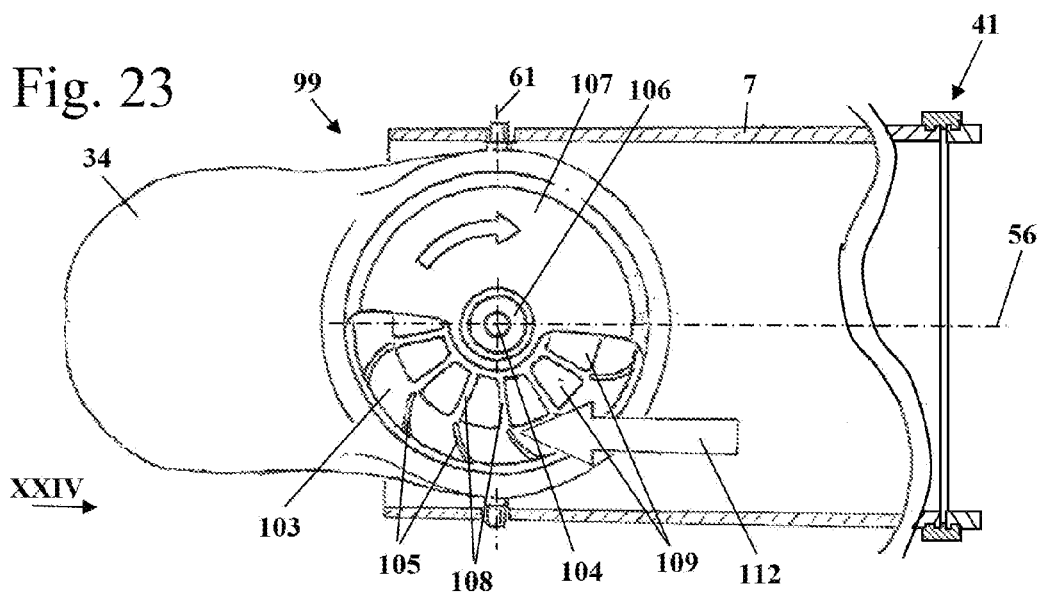
FIG. 23 is a schematic section illustration of an embodiment of a blower tube with pivoting device.
Figure 24:
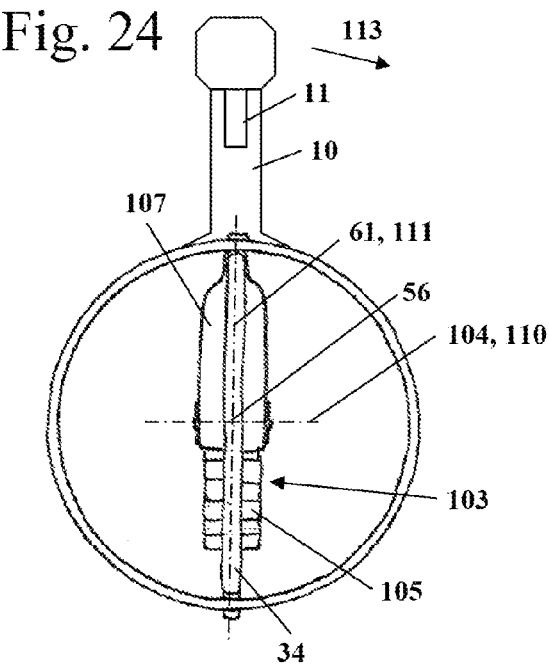
FIG. 24 is a side view in the direction of arrow XXIV of FIG. 23.
Figure 25:
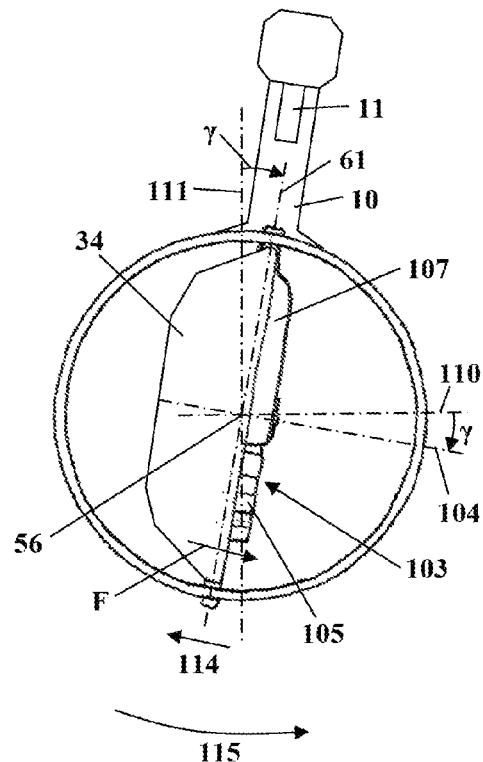
FIG. 25 is a side view in accordance with FIG. 24 after pivoting of the handle.

FIGS. 23 to 25 show a further embodiment of a pivoting device 99. The blower tube 7 is rotatably supported by means of a rotary joint 41 about longitudinal center axis 56 in accordance with the embodiment of FIG. 7. The handle 10 illustrated in FIGS. 24 and 25 is fixedly connected to the blower tube 7. In the blower tube 7, the flow guiding element 34 is supported pivotably about pivot axis 61. The flow guiding element 34 extends substantially in the area that is downstream of the pivot axis 61. The pivot axis 61 extends perpendicularly to the longitudinal center axis 56. On the flow guiding element 34 that is substantially embodied as a planar plate, a rotor 103 is rotatably supported by means of bearing 106 about axis of rotation 104. The axis of rotation 104 and the pivot axis 61 are arranged perpendicularly to each other and are positioned in the same plane. The rotor 103 is embodied as a fan wheel and supports a plurality of vanes 105. In the embodiment the rotor 103 is provided with vanes on both sides. The vanes 105 are exposed to the air stream only in the area of the rotor 103 where the vanes 105 are to be moved in the direction of the blower air stream in the blower tube 7 and where the blower air stream produces a force in the desired rotational direction. The blower air stream flows in the direction of arrow 112. In the area where the air guiding vanes 105 are moving opposite to the flow direction of the blower air stream in the blower tube 7, the air guiding vanes 105 are covered by cover 107.

The rotor 103 is advantageously of a lightweight construction. In the shown embodiment, the rotor 103 is provided with recesses 109 that are arranged in radial direction inwardly relative to the air guiding vanes 105 and serve for weight reduction; they are separated by ribs 108 from each other. In FIG. 24, the pivoting device 99 is shown in the rest position. The flow guiding element 34 is oriented parallel to the flow direction in the blower tube 7 so that no force about the pivot axis 61 is generated at the flow guiding element 34.

The axis of rotation 104 of the rotor 103 coincides with the horizontal 110 and the pivot axis 61 of the flow guiding element 34 coincides with the vertical 111.

For pivoting the blower tube 7, the operator tilts the handle 10 in the direction of arrow 113 and pivots in this way the blower tube 7 about the longitudinal center axis 56, for example, into the position illustrated in FIG. 25. In this position the axis of rotation 104 is positioned at a slant relative to the horizontal 110 at an angle γ. A corresponding angle γ results between the pivot axis 61 and the vertical 111. Pivoting or tilting of the axis of rotation 104 of the rotating rotor 103 generates gyroscopic forces that act about pivot axis 61 and cause pivoting of the flow guiding element 34 in the direction of arrow 114, i.e., onto the side that is opposite to the side toward which the handle has been tilted. In the view of FIGS. 24 and 25, the handle 10 has been tilted to the right and the flow guiding element 34 has been pivoted to the left with its is downstream end. The blower air stream generated at the flow guiding element 34 generates a transverse force F acting on the flow guiding element 34 that is oriented transverse to the air stream direction and this force F moves the blower tube in the direction of arrow 115. The blower tube 7 pivots thus in the direction in which the handle 10 has been tilted.

Upon tilting of the handle 10 to the opposite side, the flow guiding element 34 is adjusted in the opposite direction, the transverse force acts in opposite direction, and the blower tube 7 is pivoted in the opposite direction to the arrow 115 in FIG. 25. The angle about which the handle 10 is tilted determines the magnitude of the gyroscopic forces acting on the flow guiding element 34 and thus the pivot angle of the flow guiding element 34, the magnitude of the counterforce F, and the force with which the blower tube 7 of pivoted. In the embodiment according to FIGS. 23 to 25 a simple configuration with few individual parts is realized. No additional energy source is required. Since the flow guiding element 34 is adjusted automatically into the central position as a result of the forces generated in operation by the air stream, a calibration of the system is not required.

The afore described embodiment variants for the actuating element, the transmission to the device for tilting the outflow direction, and the device for tilting the outflow direction can also be combined differently with each other. In the Figures, same reference numerals characterize elements that correspond functionally to each other.

Figure 26:
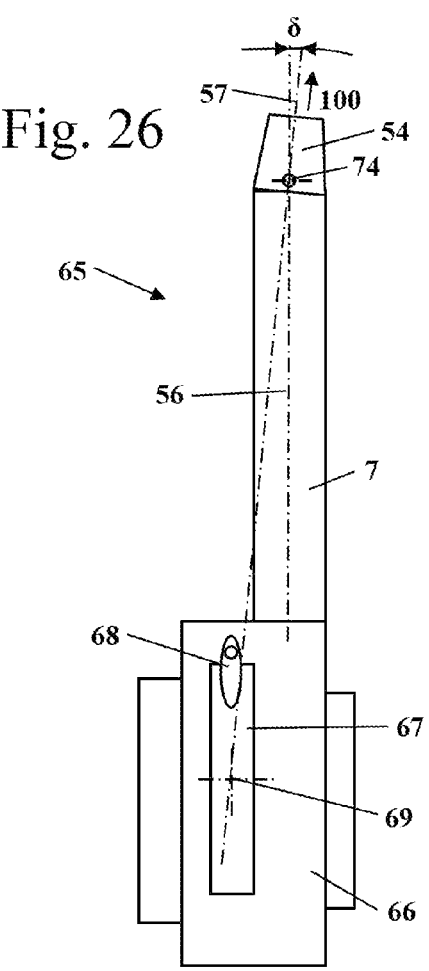
FIG. 26 is schematic plan view of an embodiment of the blower apparatus as shown in FIG. 13 in rest position.

In the illustrated embodiments, the flow guiding element 34 or the nozzle 54 is arranged in the rest position such that the outflow direction 100 is parallel to the longitudinal center axis 56 of the blower tube 7. However, it may also be advantageous that the flow guiding element 34 or the nozzle 54 in the rest position is inclined by a few degrees relative to the longitudinal center axis 56 so that also the outflow direction 100 is slanted or inclined relative to the longitudinal center axis 56 by a few degrees. This is schematically illustrated in FIG. 26 for the embodiment of FIGS. 13 to 15. Because of the inclined position, the rest position of the blower tube 7 can be adjusted. As shown in FIG. 26, the handle 67 in plan view onto the blower apparatus 65 is displaced laterally to the longitudinal center axis 56 of the blower tube 7. Because of this axis displacement, the outflow of the blower apparatus causes torque acting about the pivot axis 69 that in the plan view illustrated in FIG. 26 acts in counterclockwise direction. Because of the illustrated inclined position of the nozzle 54, the blower apparatus 65 in the rest position is substantially free of any forces acting on it and the operator in the rest position must not exert any force on the blower apparatus 65 in order to hold the blower tube 7 in the rest position. For this purpose, the longitudinal center axis 57 of the nozzle 54 is advantageously oriented such that the longitudinal center axis 57 intercepts approximately the pivot axis 69 of the blower apparatus 65. Accordingly, the air flow does not cause torque about the pivot axis 69. The longitudinal center axis 56 of the blower tube 7 is positioned relative to the longitudinal center axis 57 of the nozzle 54 at an angle δ that advantageously amounts to a few degrees.

Figure 27:
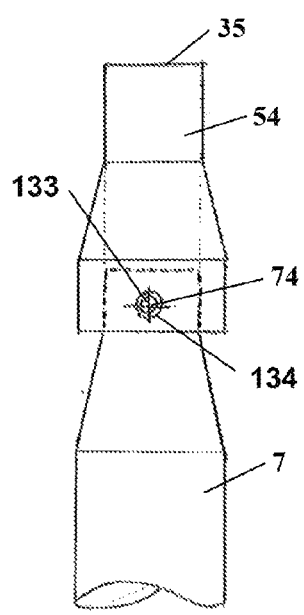
FIG. 27 shows a schematic plan view of a detail of an embodiment of the blower tube.

FIG. 27 shows a blower tube 7 of the blower apparatus on which nozzle 54 is supported so as to be pivotable about pivot axis 74. The nozzle 54 is supported on the blower tube 7 so as to be freely pivotable. For this purpose, pins 133 are provided which project into openings 134. In the illustrated embodiment, the pins 133 are provided on the nozzle 54 and the openings 134 on the blower tube 7. However, a different configuration of the pivot support action of the nozzle 54 may be advantageous also. The nozzle 54 is pivotably supported on the blower tube 7 (pivot axis 74) adjacent to a first end of the nozzle 54; the outlet opening 35 is provided at the second end of the nozzle 54 that is opposite the pivot axis 74. In the area between the pivot axis 74 and the outlet opening 35, the nozzle 54 comprises a section where the flow cross-section decreases.

Figure 28:
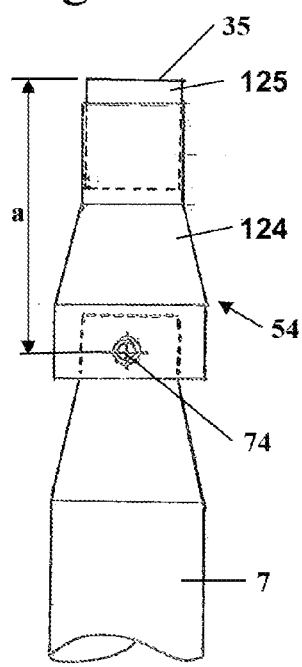
FIG. 28 shows a schematic plan view of a further embodiment of the blower tube with a variable tube length.
Figure 29:
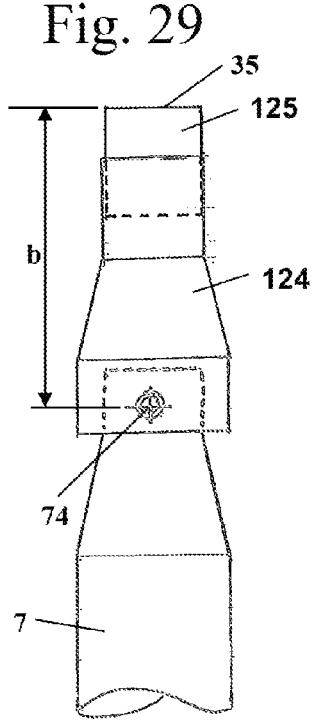
FIG. 29 shows a schematic plan view of the embodiment of the blower tube of FIG. 28 with changed tube length.

FIGS. 28 and 29 show a further embodiment of a nozzle 54 that is freely pivotably supported on the blower tube 7. The nozzle 54 comprises a base member 124 which is pivotably supported on the blower tube 7 about pivot axis 74. In the illustrated embodiment, an adjusting device in the form of an extension member 125 which is of a tubular configuration is inserted into the base member 124. In the position of the extension member 125 on the base member 124 illustrated in FIG. 28, the outlet opening 35 has a first distance a relative to the pivot axis 74. By pulling out the extension member 125 from the base member 124, this distance can be enlarged. FIG. 29 shows the outlet opening 35 at a distance b relative to the pivot axis 74; this distance b is greater than the distance a. The change of the distance between outlet opening 35 and pivot axis 74 can be advantageously realized so as to be continuous.

Figure 30:
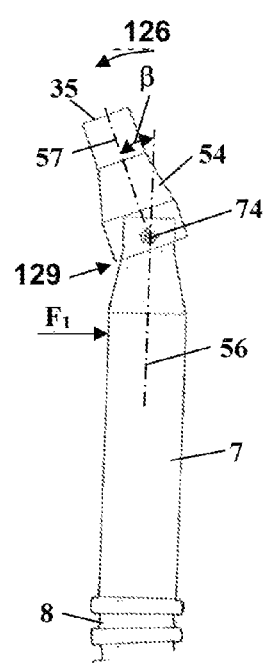
FIG. 30 is a schematic illustration of the blower tube of FIG. 27 in a first position of the pivot action.
Figure 31:
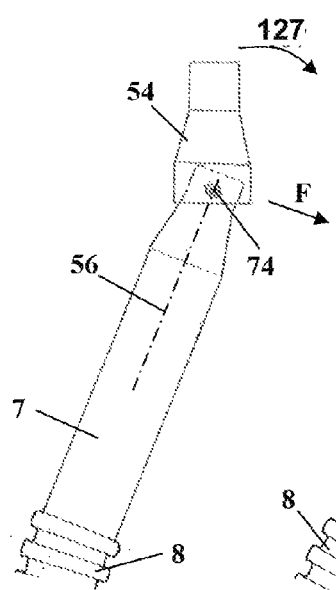
FIG. 31 is a schematic illustration of the blower tube of FIG. 27 in a second position of the pivot action.
Figure 32:
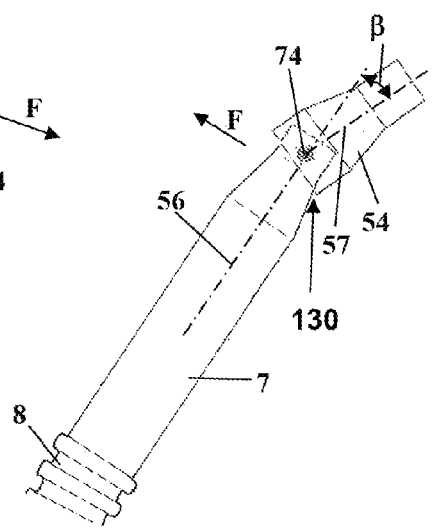
FIG. 32 is a schematic illustration of the blower tube of FIG. 27 in a third position of the pivot action.

FIGS. 30 to 32 show the embodiment according to FIG. 27 in different positions. When the operator desires to pivot the blower tube 7 out of the position shown in FIG. 27, the operator applies force $F_1$ to the blower tube 7, as illustrated in FIG. 30, and moves the blower tube 7 in FIG. 30 to the right. Due to its mass inertia, the nozzle 54 performs a pivot movement in opposite direction, i.e., in the direction of arrow 126 in FIG. 30. The pivot movement continues until the nozzle 54 has reached its end position illustrated in FIG. 30. In this end position, the lower rim of the nozzle 54 and the wall of the blower tube 7 form a first stop 129. The longitudinal center axis 56 of the blower tube 7 and the longitudinal center axis 57 of the nozzle 54 are positioned in this position at angle β relative to each other. The angle β about which the nozzle 54 can pivot out of its central position, in which the longitudinal center axes 56 and 57 are parallel to each other, is advantageously at least 1°, in particular at least 5°, preferably at least 10°. Advantageously, the angle β is smaller than 50°, in particular smaller than 45°. In the embodiment, an angle β of approximately 20° is provided.

As a result of the slanted position of the nozzle 54, the blower air stream that is flowing through the nozzle 54 generates a transverse force F, illustrated in FIG. 31, acting on the blower tube 7; this transverse force F assists the pivot movement which has been initiated by the operator via the force $F_1$. The blower tube 7 with the nozzle 54 pivots in the direction of arrow 127 in FIG. 31. The arrow 127 points in a direction opposite to the direction of arrow 126. In the embodiment, the blower tube 7 belongs to a backpack blower apparatus 1 and is attached by means of a folded bellows section 8. With increasing deflection of the blower tube 7 from its central position, the folded bellows section 8 exhibits increasing stiffness and therefore brakes or slows down the movement of the blower tube 7. As a result of this braking action and the mass inertia of the nozzle 54, the nozzle 54 pivots in the direction of arrow 127 about the pivot axis 74 relative to the blower tube 7. As soon as the nozzle 54 has pivoted past the position in which the longitudinal center axes 56 and 57 are parallel to each other, the nozzle 54 exerts a force onto the blower tube 7 which acts in the direction opposite to arrow 127 in FIG. 31 and actively brakes the movement of the blower tube 7. With appropriate mass inertia, i.e., with appropriate mass distribution of the nozzle 54, the pivot movement of the nozzle 54 relative to the blower tube 7 continues until the nozzle 54 comes to rest at a second stop 130 which is formed between the blower tube 7 and the nozzle 54. This position is shown in FIG. 32. The stop 130 defines the second end position of the nozzle 54. In the embodiment, the stop 130 is thus also formed between the lower rim of the nozzle 54 and the outer wall of the blower tube 7. In the end position illustrated in FIG. 32, the longitudinal center axes 56 and 57 are positioned at angle β relative to each other whose absolute value is advantageously the same as that of angle β of FIG. 30 and is measured in the opposite direction. As a result of the angle β, the blower air stream that is passing through the nozzle 54 exerts a transverse force F in opposite direction, i.e., in FIG. 32 to the left, onto the blower tube 7 that pivots the blower tube 7 in the opposite direction, i.e., in FIG. 32 to the left.

Due to the free pivotability of the nozzle 54 relative to the blower tube 7 by twice the angle range of the angle β, an alternating transverse force F is exerted on the blower tube 7 which causes the blower tube 7 to pivot back and forth. The amplitude and the frequency of the pivot movement depend in particular on the mass distribution of the nozzle 54, on the distance a, b of the outlet opening 35 relative to the pivot axis 74 (FIGS. 28 and 29), and on the inherent stiffness of the folded bellows section 8. Depending on the configuration of the nozzle 54 and the position of the stops 129 and 130, the nozzle 54 must not reach its end positions during the pivot movement which are defined by the stops 129, 130. In particular nozzles 54 with minimal weight can be self-centering. This can be provided in particular when the self-centering forces are comparatively large in comparison to the mass inertia forces.

Figure 33:
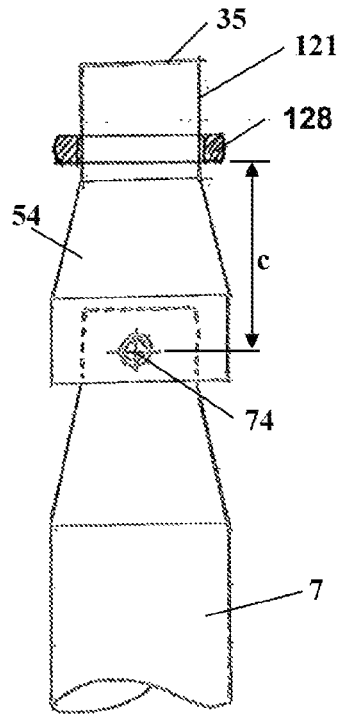
FIG. 33 shows a schematic detail illustration of a further embodiment of the blower tube with a ring as mass body.
Figure 34:
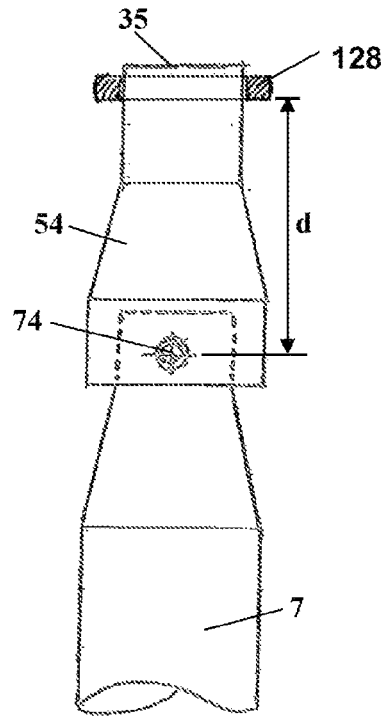
FIG. 34 shows a schematic detail illustration of the embodiment of FIG. 33 with adjusted position of the ring.

In FIGS. 33 and 34, an embodiment of nozzle 54 is shown on which an adjusting device in the form of a mass body is adjustably supported. In the embodiment, the mass body is designed as a ring 128 which is slidably supported on a cylindrical section 121 of the nozzle 54 adjoining the outlet opening 35. In the position illustrated in FIG. 33, the ring 128 has a distance c relative to the pivot axis 74. The ring 128 can be displaced in the direction toward the outlet opening 35 until the ring 128 has a distance d relative to the pivot axis 74 in the position illustrated in FIG. 34; this distance d is significantly greater than the distance c. The longer the nozzle 54, the greater the force which is exerted on the blower tube 7. It is also possible to provide different exchangeable nozzles 54 that can be attached to the blower tube 7 instead of the nozzle 54 with adjustable length.

Figure 35:
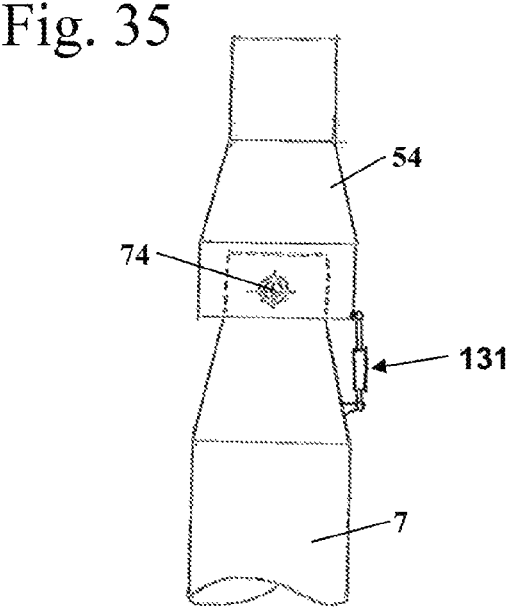
FIG. 35 shows a further embodiment of the blower tube with damping device in a schematic detail view.

In the embodiment according to FIG. 35, a damping device 131 is provided between the nozzle 54 and the blower tube 7. The damping device 131 dampens the pivot movement of the nozzle 54 and influences in this way frequency and amplitude of the pivot movement of the blower tube 7. The damping device 131 can be adjustable with regard to its damping action. For example, the damping device 131 can be a hydraulic or pneumatic spring. The damping device 131 is a damping device which dampens the movement of the nozzle 54 and advantageously exerts a higher damping force on the nozzle 54 as the speed increases. Friction forces which act between the blower tube 7 and the nozzle 54 can prevent, on the other hand, movement of the nozzle 54 relative to the blower tube 7 because the friction that is acting at standstill is greater than the sliding friction acting upon relative movement. The friction forces between blower tube 7 and nozzle 54 therefore should be as small as possible and cannot replace a damping device 131 between blower tube 7 and nozzle 54.

Figure 36:
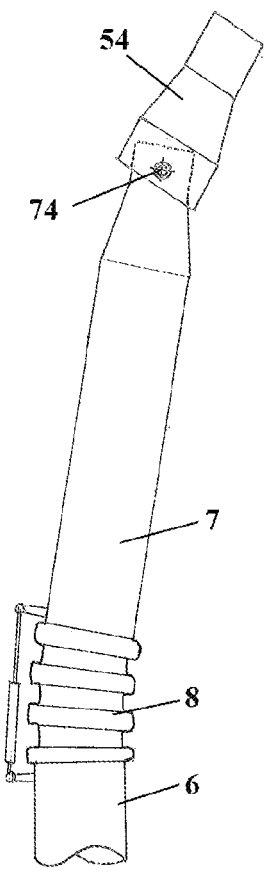
FIG. 36 shows a further embodiment of the blower tube with damping device in a schematic detail view.

In the embodiment according to FIG. 36, a damping device 132 is provided that is bridging the folded bellows section 8 and is secured on the blower spiral 6 and the blower tube 7. The damping device 132 can also be adjustable with regard to its damping action and affects the amplitude and frequency of the pivot movement of the blower tube 7.

Figure 37:
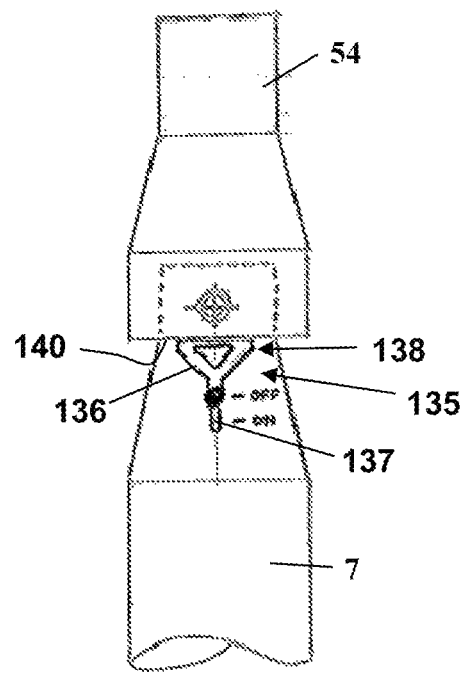
FIG. 37 shows a further embodiment of the blower tube in a schematic detail view in first stage of a blocking device.
Figure 38:
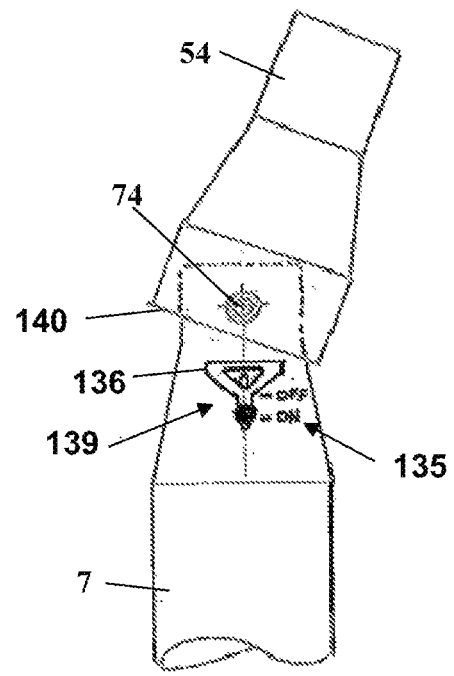
FIG. 38 shows the embodiment of FIG. 37 in a second stage of the blocking device.

In the embodiment according to FIGS. 37 and 38, a blocking device 135 is shown. In FIG. 37, the blocking device 135 is in a blocking position 138. In the blocking position 138, the blocking device 135 blocks the pivot movement of the nozzle 54. The nozzle 54 acts like a rigid extension of the blower tube 7 and is therefore not pivotable relative to the blower tube 7. In the embodiment, the blocking device 135 has a locking lever 136 which is slidably supported in a longitudinal groove 137 of the blower tube 7. In the blocking position 138 shown in FIG. 37, the locking lever 136 is resting on a lower rim 140 of the nozzle 54 and prevents therefore the pivot movement of the nozzle 54.

FIG. 38 shows the blocking device 135 in its release position 139. The locking lever 136 has been displaced in the longitudinal groove 137 such that it does not contact the rim 140 of the nozzle 54. In the release position 139 illustrated in FIG. 38, the nozzle 54 is freely movable about pivot axis 74 between its end positions.

In the embodiments according to FIGS. 27 to 38, no actuating device such as an actuator or the like to be actuated by the operator is provided. The adjustment of the slant of the outflow direction is instead generated by the pivotability of the nozzle 54 relative to the blower tube 7 as a result of the nozzle's inertia. The pivot movement can be terminated when the operator lets go of the throttle trigger of the blower apparatus so that the blower air stream is reduced.

The nozzles 54 illustrated in FIGS. 27 to 36 can be provided on any of the illustrated blower apparatus 1, 65, 75, 90.

While specific embodiments of the invention have been shown and described in detail to illustrate the inventive principles, it will be understood that the invention may be embodied otherwise without departing from such principles.

What is claimed is:

1. A blower apparatus comprising:
a drive motor;
a blower device operatively connected to said drive motor;
a blower tube connected with a first end to the blower device and having an outlet opening at a second end remote from the first end, wherein a blower air stream conveyed by the blower device passes through the blower tube in a direction of a longitudinal center axis of the blower tube and exits through the outlet opening in an outflow direction;
a pivoting device configured to pivot the blower tube;
a nozzle supported freely pivotable on the blower tube about at least one pivot axis, wherein the outlet opening is formed on the nozzle;
wherein the nozzle forms the pivoting device and utilizes a transverse force to pivot the blower tube, the transverse force generated by the blower air stream within the nozzle.

2. The blower apparatus according to claim 1, further comprising at least one stop between the nozzle and the blower tube, wherein the at least one stop determines an end position of a pivot movement of the nozzle.

3. The blower apparatus according to claim 1, wherein the nozzle comprises an adjusting device that is configured to adjust an amplitude and/or a frequency of a pivot movement of the blower tube.

4. A blower apparatus comprising:
a drive motor;
a blower device operatively connected to said drive motor;
a blower tube connected with a first end to the blower device and having an outlet opening at a second end remote from the first end, wherein a blower air stream conveyed by the blower device passes through the blower tube in a direction of a longitudinal center axis of the blower tube and exits through the outlet opening in an outflow direction;

a pivoting device configured to pivot the blower tube;

a nozzle supported freely pivotable on the blower tube about at least one pivot axis, wherein the outlet opening is formed on the nozzle;

wherein the nozzle forms the pivoting device and utilizes a transverse force to pivot the blower tube, the transverse force generated by the blower air stream within the nozzle;

wherein the nozzle comprises an adjusting device that is configured to adjust an amplitude and/or a frequency of a pivot movement of the blower tube;

wherein the adjusting device comprises a mass body, wherein a position of the mass body relative to the at least one pivot axis of the nozzle is changeable.

5. The blower apparatus according to claim 4, wherein the mass body is slidably arranged on the nozzle.

6. The blower apparatus according to claim 3, wherein a distance of the at least one pivot axis relative to the outlet opening is adjustable.

7. The blower apparatus according to claim 1, further comprising a blocking device comprising a blocking position and a release position, wherein the blocking device blocks in the blocking position a pivot movement of the nozzle relative to the blower tube about the at least one pivot axis and enables the pivot movement of the nozzle relative to the blower tube about the at least one pivot axis in the release position.

8. The blower apparatus according to claim 1, further comprising a damping device that dampens a pivot movement of the blower tube.

9. The blower apparatus according to claim 8, wherein the damping device dampens a pivot movement of the nozzle about the at least one pivot axis.

10. The blower apparatus according to claim 8, wherein the damping device has an adjustable damping action.

11. The blower apparatus according to claim 1, further comprising a damping device that dampens a pivot movement of the nozzle about the at least one pivot axis.

12. The blower apparatus according to claim 11, wherein the damping device has an adjustable damping action.

13. The blower apparatus according to claim 1 in the form of a handheld blower apparatus comprising a housing on which said blower tube and a handle are secured.

14. A blower apparatus comprising:
a drive motor;
a blower device operatively connected to said drive motor;
a blower tube connected with a first end to the blower device and having an outlet opening at a second end remote from the first end, wherein a blower air stream conveyed by the blower device passes through the blower tube in a direction of a longitudinal center axis of the blower tube and exits through the outlet opening in an outflow direction;
a pivoting device configured to pivot the blower tube;
a nozzle supported freely pivotable on the blower tube about at least one pivot axis, wherein the outlet opening is formed on the nozzle;
wherein the nozzle forms the pivoting device and utilizes a transverse force to pivot the blower tube, the transverse force generated by the blower air stream within the nozzle;
wherein the blower apparatus is a backpack blower apparatus comprising a carrying frame to be carried on the back of an operator, wherein said blower tube is movably arranged relative to said carrying frame and wherein a handle is arranged on said blower tube.

15. The blower apparatus according to claim 1, wherein the nozzle is supported freely pivotable on the blower tube such that the nozzle aligns itself freely in accordance with inertia forces and mass forces acting on the nozzle.

16. The blower apparatus according to claim 1, wherein the nozzle is supported freely pivotable on the blower tube such that the nozzle, when the blower tube is pivoted, pivots as a result of the mass inertia of the nozzle relative to the blower tube, wherein friction forces acting between the nozzle and the blower tube are so small that mass inertia forces of the nozzle are sufficient to pivot the nozzle relative to the blower tube.

17. The blower apparatus according to claim 1, wherein the at least one pivot axis passes through the nozzle and through the blower tube.

18. The blower apparatus according to claim 1, wherein the at least one pivot axis intercepts a longitudinal center axis of the blower tube.

19. The blower apparatus according to claim 1, wherein the blower air stream generates in the nozzle an alternating transverse force that causes the blower tube to pivot back and forth.

20. The blower apparatus according to claim 1, comprising a pivot bearing supporting the nozzle on the blower tube.

* * * * *